Patented Sept. 24, 1935

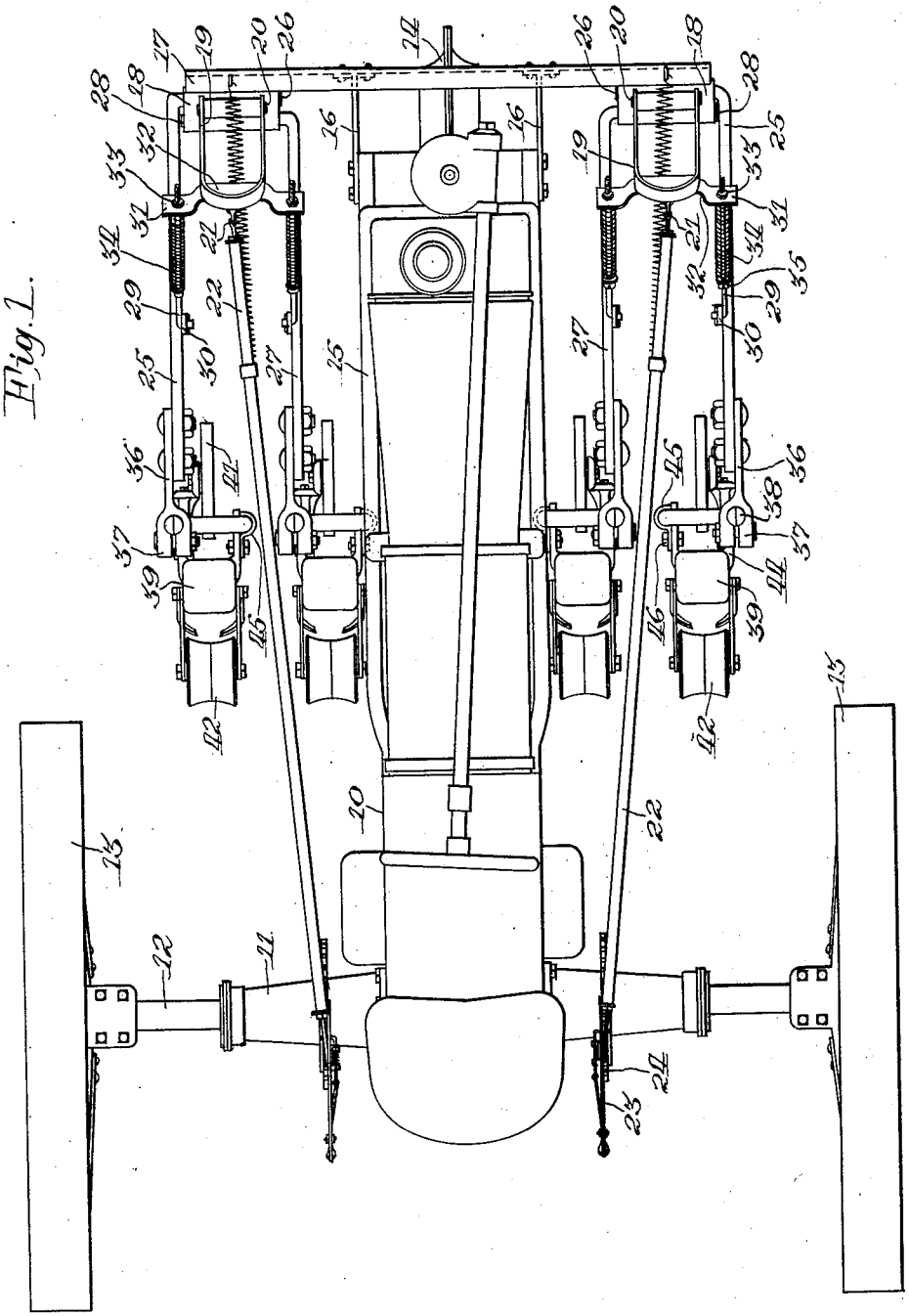

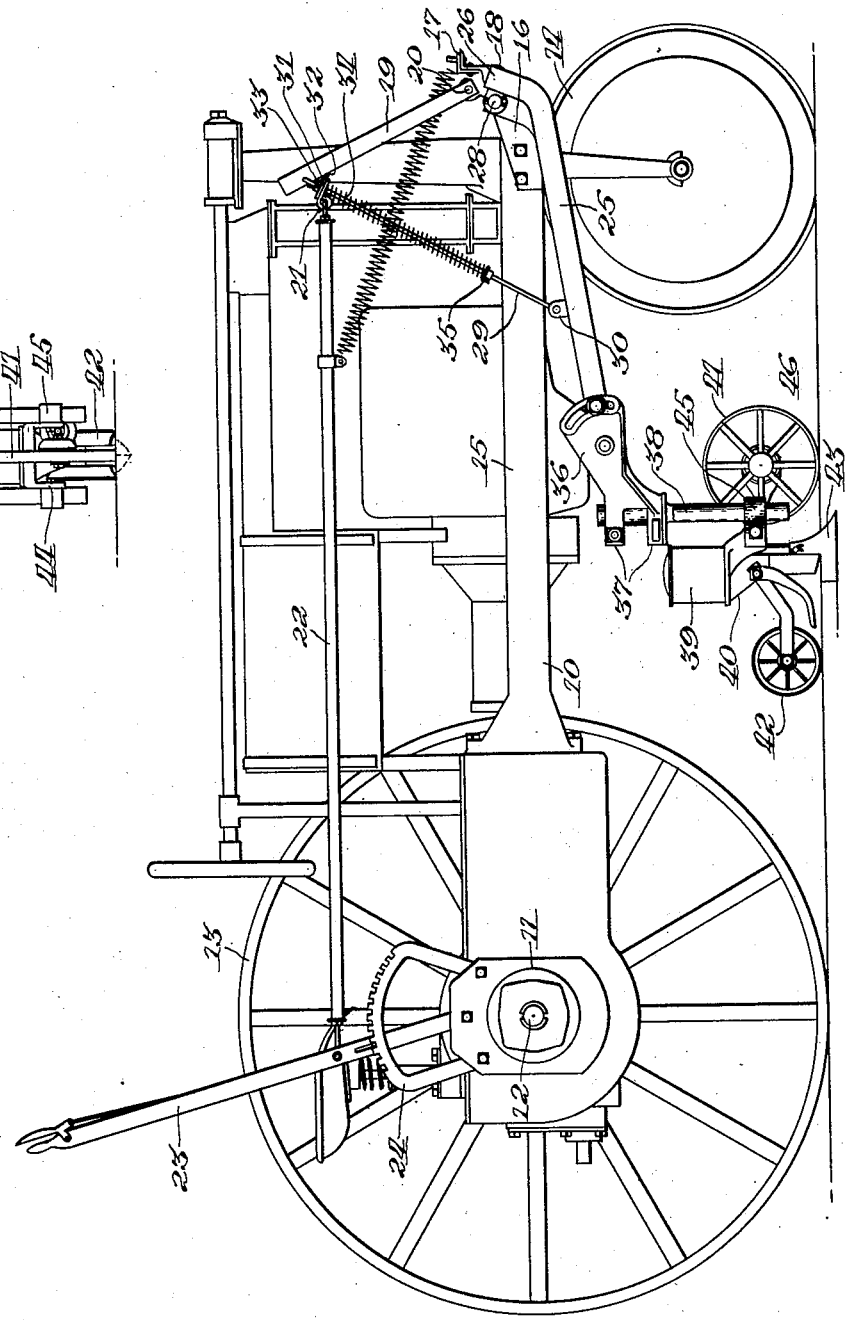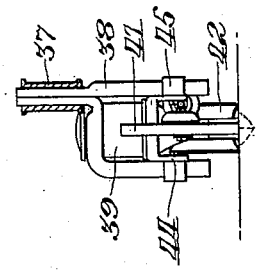

2,015,584

UNITED STATES PATENT OFFICE 2,015,584

PLANTING ATTACHMENT FOR TRACTOR CULTIVATORS

Bert R. Benjamin, Oak Park, Ill., assignor to International Harvester Company, a corporation of New Jersey Application August 20, 1934, Serial No. 740,623

6 Claims. (Cl. 111—84)

This invention relates to a planting device. More specifically it relates to a planter attachment for a tractor cultivating implement.

With the so-called general purpose tractor, which is in wide use at the present time, it is desirable to attach different implements to the tractor for different purposes, and to make changes from one implement to another with a minimum of expenditure of time and effort. It is also desirable to utilize the same attaching frame and lifting means when possible to reduce the cost of a complete line of equipment. Particularly for truck gardening, it has been found desirable to use for attaching to a tractor small planter units of conventional structure which have been designed particularly for planting small garden seeds.

The principal object of the present invention is to provide means for mounting a plurality of planter units on the beam arrangement of a tractor cultivator. Other objects, such as the adjustability of the planter units and providing structure for permitting removal of units, will be understood from the following detailed description. The objects of the invention are accomplished by a construction such as illustrated in the accompanying drawings, in which:

Figure 1 is a top plan view of a general purpose tractor of the tricycle type having mounted thereon a supporting frame and beams to which a plurality of planter units are attached;

Figure 2 is a side elevation of the tractor and attachment shown in Figure 1, a section being taken through one axle better to show the lifting mechanism for the attachment implement; and, Figure 3 is a vertical transverse section taken through the bracket which supports the vertical standards on which the planter units are mounted. In this view the standards and the planter unit are shown in elevation.

The tractor shown is of the so-called row crop or tricycle type having a long narrow body portion 10, of which the engine and driving mechanism are a part, laterally extending axle housings 11 at the rear, axles 12 extending from said housings, adjustable wide tread wheels 13 mounted on said axles, and a centrally located front wheel 14. The front part of the body portion 10 is formed by a frame 15. At the forward end of said frame and at each side thereof a bracket 16, rigidly secured to the frame, extends upwardly and forwardly therefrom. A transverse angle bar 17 secured to said brackets extends laterally to each side of the tractor.

On each end of the bar 17, an attaching bracket 18 is rigidly secured. A U-shaped member 19 is pivoted to said bracket on a transverse pivot pin 20. Said bracket extends upwardly and rearwardly and is suitably connected by eye bolts 21 with a rearwardly extending lifting bar 22. At its rear end said bar is pivotally connected with a lifting lever 23. Said lever is pivotally connected on the rear axle housing and is releasably engageable with a sector 24 by means of a latch carried on the lifting lever. It is to be understood that the construction at each side of the tractor is the same.

A rearwardly extending beam 25 is provided at its forward end with an inwardly and transversely extending portion 26, which is pivotally mounted on a transverse axis in the bracket 18, and a longitudinally extending portion, which forms the supporting beam for a planting unit. In addition to the beams 25, one at each side of the tractor, there is also a beam 27 at each side of the tractor between the outer beam 25 and the body of the tractor. The beams 27 are provided with right angled end portions 28, which are also pivotally mounted on a transverse axis in the brackets 18.

To provide lifting means for the beams 25 and 27, lifting rods 29 are pivotally secured to brackets 30, rigidly fastened to the beams rearwardly of their pivot axes. The lifting rods 29, slidably extend through apertured ears 31 secured to the upper ends of the U-shaped lifting members 19. As best shown in Figure 1, the ears 31 are the outer portions of transverse members 32, which are welded or otherwise secured to the upper ends of the U-shaped members 19. Nuts 33, adjustably threaded on the upper ends of the rods 29, provide means for adjusting the lifting means. Springs 34, abutting against the lower sides of the ears 31 and against adjustable stops 35 on the rods, provide adjustable resilient means for urging the beams 25 and 27 downwardly.

At the rearward ends of the beams 25 and 27, standard supporting brackets 36 are mounted for angular adjustment about a transverse axis. Said brackets are formed with integral clamping portions 37 in which the semi-circular portions of standards 38 are simultaneously clamped. One of said standards depends substantially vertically downwardly from the clamping means. The other standard, as shown in Figures 1 and 3, is offset transversely providing, as best shown in Figure 3, two substantially vertical, transversely spaced ground engaging portions. These standards provide a novel cultivating means as disclosed and claimed in my copending application, Serial No. 729,188. For garden work it has been found that these circular cross section standards form very satisfactory cultivating elements, particularly for weeding and for breaking surface crust.

The standards 38 also provide very satisfactory means for attaching planting units 39. Said units will not be described in detail, as they are of a conventional construction such as is commonly used in garden planters. The frame structure 40 of the planter units supports a forward gauge wheel 41, which, as is conventional practice, drives mechanism for operating the seed dispensing means of the planter. The frame structure also supports a rear gauge and cover wheel 42. A furrow opener 43 provides means for depositing the seed dispensed from the planter. As previously described, these planter units may be of conventional construction, except for the provision of means adapting them for securing to the standards 38.

At each side of the frame structure 40 of each of the planter units, a forwardly extending arm 44 is provided. Said arms are spaced apart the same distance as the space between the standards 38. Clamps 45 co-operate with the arms 44 to form means for removably and adjustably securing the planters to the standards 38. It will be understood that the planter units may readily be removed by loosening bolts 46, which secure the clamps 45 to the arms 44. The planter units may also be adjusted vertically with respect to the standards 38 by loosening the clamps 45.

When it is desired to lift the planter units from operative position or to discontinue operation of the seeding mechanism, the planter units are lifted clear of the ground by the lifting mechanism previously described which pivots the beams 25 and 27 upwardly about their transverse pivot axes on the brackets 18. The beams are of sufficient rigidity to maintain the planter units in properly spaced position against lateral movement. Said units are free to float up against the spring 34 and also to move downwardly if said springs have been put under compression by the forward movement of the levers 23.

The pivotal mounting of the securing bracket 36 on the beams 27 provide means for adjusting the position of the standards 38 to secure proper horizontal location of the planter units for operating with the front and rear wheels properly contacting the soil.

It is to be understood that applicant has above described only a preferred embodiment of his invention, which has been illustrated in the drawings, and that he claims as his invention all modifications falling within the scope of the appended claims.

What is claimed is:

1. A planting device comprising a wheeled supporting structure, a beam adjustably connected to said structure, a pair of laterally spaced standards secured to said beam, and a narrow planting unit positioned between said standards and secured thereto.

2. A planting device comprising a wheeled supporting structure, a beam adjustably connected to said structure, a pair of laterally spaced standards secured to said beam, and a narrow wheel supported planting unit positioned between said standards and removably and adjustably secured thereto.

3. A planting device comprising, in combination with a wheeled supporting structure, a beam pivotally connected on a transverse axis to said supporting structure, a pair of substantially vertical standards secured in transversely spaced relation to said beam, and a narrow wheel supported planting unit positioned between said standards and removably secured thereto.

4. A planting device comprising, in combination with a supporting structure, a draft beam pivotally connected on a transverse axis to said structure, a pair of substantially vertical standards secured in transversely spaced position to said beam for angular adjustment about a transverse axis with respect thereto, and a wheel supported planting unit removably secured to said standards.

5. A planting device comprising, in combination with a supporting structure, a draft beam pivotally connected on a transverse axis to said structure, a pair of substantially vertical standards secured in transversely spaced position to said beam for angular adjustment about a transverse axis with respect thereto, and a narrow wheel supported planting unit positioned between said standards and removably secured thereto.

6. A tractor mounted multiple row planter comprising, in combination with a tractor having a narrow front support, a transverse implement supporting structure extending laterally from the tractor, a plurality of transversely spaced independently pivoted implement beams connected to said support, means for lifting said beams, two transversely spaced, substantially vertical standards secured to each of said beams, and a narrow wheel supporting planting unit positioned between each pair of said standards and removably secured thereto.

BERT R. BENJAMIN.